Dec. 1, 1942.    R. S. MILLER    2,303,946
POWER TRANSMISSION
Filed Dec. 10, 1938
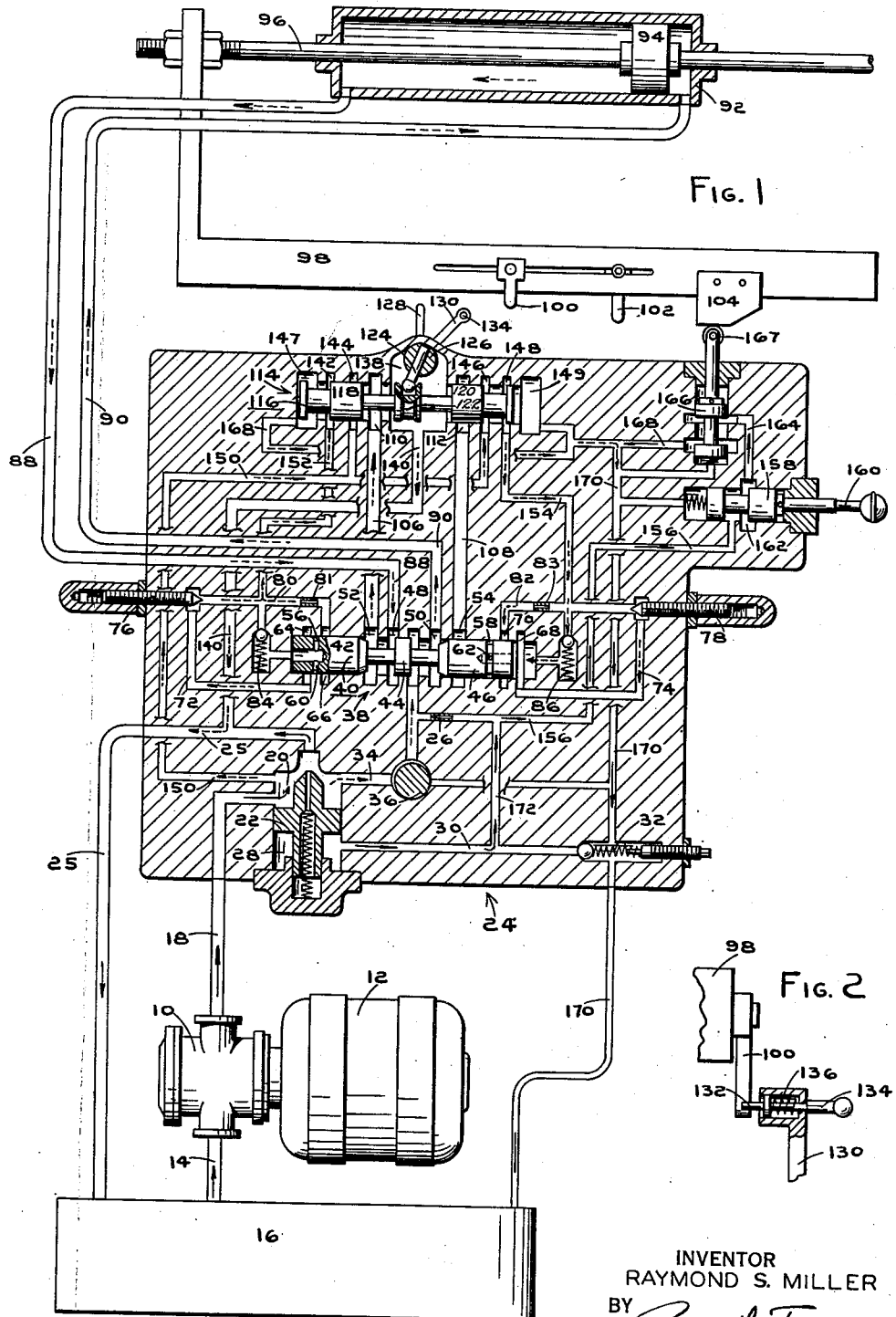
INVENTOR
RAYMOND S. MILLER
BY
Ralph L. Tweedale
ATTORNEY Patented Dec. 1, 1942

2,303,946

UNITED STATES PATENT OFFICE 2,303,946

POWER TRANSMISSION

Raymond S. Miller, Detroit, Mich., assignor to Vickers Incorporated, Detroit, Mich., a corporation of Michigan Application December 10, 1938, Serial No. 244,909

7 Claims. (Cl. 60—52)

This invention relates to power transmissions, particularly to those of the type comprising two or more fluid pressure energy translating devices one of which may function as a pump and another as a fluid motor.

This invention is more particularly concerned with providing means for imparting a reciprocating movement to a slide or table such as is used, for instance, on grinders.

The usual reciprocating grinder has a table or slide on which the work element or the tool element is carried for continuous reciprocating movement during the grinding operation. During the actual working operation, this reciprocation is carried on continuously with automatic reversal at each end of the stroke until the work is ground to the required size. When the work operation is completed it is necessary to retract the slide to separate the work and the grinding wheel for removal of the finished piece and replacement of a new work piece. For this purpose the slide is usually permitted to reciprocate beyond its normal limit of travel in one direction and is brought to a stop at the extreme limit of movement of the slide.

There have been numerous hydraulic transmission systems designed for operating a grinder of this class, many of them being rather cumbersome and requiring a large amount of piping and intricate control valves. Another defect common to systems previously proposed has been the inability to control the acceleration and deceleration of the slide at the ends of its normal working stroke with sufficient accuracy under all possible settings for speed and for length of stroke.

It is an object of the present invention accordingly to provide an improved power transmission system particularly adapted for operating grinders wherein the control valves may all be incorporated in a unitary panel which may be applied to a grinder with a minimum of piping connections and which provides improved operation of the grinder particularly with regard to maintaining any desired rate of deceleration and acceleration at each reversal of the slide.

It is also an object to provide a power transmission system of this character wherein the deceleration and acceleration are not subject to variation when the length of stroke of the slide is adjusted or when the speed of travel of the slide is adjusted.

It is also an object to provide a transmission system of this character wherein the rate of travel of the slide may be maintained constant regardless of variations in the resisting load which the slide imposes on the power transmission system, yet which permits of ready adjustment of the speed of travel of the slide.

Another object is to provide a compact control panel to house the necessary valves for controlling the complete operation of the slide.

Further objects and advantages of the present invention will be apparent from the following description, reference being had to the accompanying drawing wherein a preferred form of the present invention is clearly shown.

In the drawing:

Figure 1 represents a diagrammatic view of a grinder slide and control panel incorporating a preferred form of the present invention.

Figure 2 is a fragmentary view showing the construction of one of the dog-operated levers of the control panel.

Referring to Figure 1, a pump 10 adapted to be driven by a prime mover such as an electric motor 12 has a suction conduit 14 through which fluid may be withdrawn from a tank 16 and delivered to a delivery conduit 18. The conduit 18 extends to a chamber 20 of a relief valve 22 which is in a control panel 24 and is adapted to bypass fluid to tank by a conduit 25 whenever a predetermined pressure is exceeded in the chamber 20. Chamber 28 is connected by a conduit 30 to a pilot relief valve 32. A conduit 34, which has a throttle valve 36 therein, extends from the chamber 20 of valve 22 to the pressure port of a pilot-operated five-way valve 38. The chamber 28 is also in communication with the conduit 34, beyond the throttle 36, through a restrictor 26 communicating with conduit 30.

Valve 38 has a spool 40 which has lands 42, 44 and 46 that control cylinder ports 48 and 50 and tank ports 52 and 54. Lands 42 and 46 have slots 56 and 58 which connect by bores 60 and 62 respectively to the left and right end chambers of the valve 38. Land 42 also controls two pilot ports 64 and 66 and land 46 controls similar ports 68 and 70. Conduits 72 and 74 extend respectively from ports 64 and 68 to similar adjustable needle valves 76 and 78. Conduits 80 and 82, having restrictions 81 and 83 therein, extend from needle valves 76 and 78 to ports 66 and 70 respectively. Similar check valves 84 and 86 are interposed between conduit 80 and the left end chamber of valve 38 and conduit 82 and the right end chamber of valve 38.

The cylinder ports 48 and 50 of valve 38 connect by conduits 88 and 90 to the left and right ends respectively of a cylinder 92. Reciprocably mounted in cylinder 92 is a piston 94 which carries a rod 96. The rod 96 is secured to and adapted to move a slide 98. Adjustably mounted on slide 98 is a pair of dogs 100 and 102. Rigidly mounted on slide 98 is a cam 104. The two tank ports 52 and 54 of valve 38 connect by conduits 106 and 108 to ports 110 and 112 of a control valve 114. Valve 114 has a spool 116 which has lands 118 and 120 for controlling its various ports. An enlarged section 122 of spool 116 has a recess into which fits a ball-ended rod 124 secured to a rotatable shaft 126. Rigidly fastened to shaft 126 are two arms 128 and 130. The dog 102 on slide 98 is adapted to engage arm 128 at the end of its stroke when traveling to the left to shift valve spool 116 to the right through shaft 126 and rod 124. Dog 100 is adapted to engage a pin 132 of a plunger 134 (see Figure 2) mounted in arm 130 at the end of its stroke when traveling to the right to shift valve spool 116 to the left. A spring 136 holds the pin 132 in the path of dog 100.

A chamber 138 around the section 122 of valve spool 116 connects by a conduit 140 to the tank conduit 25. The valve 114 has pilot ports 142, 144, 146 and 148 to control the shifting of valve 38 and also has end chambers 147 and 149. A conduit 150 extends from the chamber 20 of relief valve 22 to the ports 144 and 146. The ports 142 and 148 connect by conduits 152 and 154 and conduits 80 and 82 to check valves 84 and 86 respectively.

A conduit 156, having restriction 26 therein, extends from the portion of conduit 34 between the throttle valve 36 and the five-way valve 38 to a starting valve 158 whose spool is spring biased to the right and which is manually operable by a plunger 160. A controlled port 162 of valve 158 connects by a conduit 164 to the upper port of a cam-operated valve 166, which is normally spring biased upwardly and is held depressed by cam 104 acting on a roller 167 of valve 166 when the slide 98 is at rest in its right-hand position. The lower port of valve 166 has a conduit 168 extending therefrom that connects to the two end chambers 147 and 149 of valve 114. A drain conduit 170 connects valves 32, 36, 162 and 166 to carry off seepage therefrom. Conduit 170 also connects to conduit 168. A conduit 172 connects between conduit 156 at the right of the restriction therein and the conduit 30 leading to the control chamber 28 of relief valve 22.

In operation, with the parts in the position shown in the drawing and the motor 12 driving the pump 10, fluid is drawn from tank 16 through conduit 14 and delivered by the pump 10 through conduit 18 to the chamber 20 of relief valve 22. The chamber 28 of relief valve 22 is open to tank by conduits 30, 172, 156, valve 158, conduit 164, valve 166, conduit 168, and conduit 170. Since the bore 26 is more restricted than this path, pressure fluid in chamber 20 will then cause valve 22 to move down to bypass the pump delivery to tank through conduit 25. The solid line arrows show the directions of fluid flow during this operation. Under these conditions the machine will remain at rest.

To start a working cycle the plunger 160 is pushed to the left causing valve 158 to block port 162 from conduit 156. Pressure fluid passing through restrictor 26 to chamber 28 aided by spring pressure now causes valve 22 to seat. For the present it may be considered as remaining seated during operation of the slide unless the pressure in chamber 20 rises above a safe value determined by the setting of the pilot relief valve 32. In such a case, pressure in chamber 20 acting through bore 26 and conduit 30 would cause the valve 32 to move off its seat to open chamber 28 to tank through conduit 170.

With relief valve 22 seated, and with the valve 114 having been previously or simultaneously shifted manually to the position illustrated, pressure fluid is delivered through conduit 34 and throttle valve 36 to the pressure port of five-way valve 38. As the spool 40 of valve 38 is in (or promptly moves to) its left-hand position fluid is delivered to cylinder port 50 and by conduit 90 to the right end of cylinder 92. The dotted line arrows show the directions of fluid flow during the leftward shifting of valve 40 and the leftward travel of piston 94. The piston 94 accordingly moves to the left with its rod 96 carrying slide 98 therewith. Fluid in cylinder 92 to the left of piston 94 passes to tank through conduit 88, ports 48 and 52 of valve 38, conduit 106, port 110 and chamber 138 of valve 114, conduit 140 and conduit 25. As the cam 104 rides off of the roller 167 of valve 166 it will allow the latter to rise and block conduit 164 from conduit 168. Plunger 160 may now be released to allow valve 158 to open conduit 156 to port 162. This has no effect however on relief valve 22 as chamber 28 is now blocked from tank by valve 166.

As the slide 98 approaches the end of its stroke to the left, adjustable dog 102 will rotate arm 128 and shaft 126 causing rod 124 to shift spool 116 of valve 114 to the right. Land 118 of spool 116 gradually will block port 110 to cut off the flow of exhaust fluid from cylinder 92. This will have a throttling effect to gradually decelerate slide 98. Due to inertia of the slide, compression of oil on the exhaust side of the cylinder, elastic yield of the cylinder and pipes, and leakage across the spool from port 110 to chamber 138, the valve spool 116 is carried completely across center. When the spool 116 has been shifted all of the way to the right ports 142 and 144 will be in communication to allow pressure fluid in chamber 20 of relief valve 22 to pass through conduit 150, valve 114, conduit 152 and check valve 84 to shift spool 40 of valve 38 to the right. Exhaust fluid from the right end of valve 38 passes at first from port 68, conduit 74, needle valve 78, conduits 82 and 154, port 146 of valve 114, end chamber 149, conduit 168 to tank conduit 170.

The slide 98 will dwell at the end of its stroke until the land 44 of valve 38 opens port 48 to the pressure port. The setting of needle valve 78 determines the time required for valve spool 40 to shift to the right which in turn determines the length of time of the slide dwell. When land 44 first opens the port 48 to pressure, slide 98 will start back to the right at a slow rate of speed but will accelerate as spool 40 continues to move to the right. As the spool 40 crosses center, land 46 of spool 40 blocks port 68 but exhaust fluid then passes through bore 62, slot 58, port 70, conduit 82 and restriction 83 and conduit 154 to tank as previously described. The restriction 83 retards the flow of exhaust fluid from the right end of valve 38 to impart a smooth acceleration to the slide, much the same as the needle valve 78 but at a different rate.

When port 48 was connected to the pressure port of valve 38, fluid was delivered through conduit 88 to the left end of cylinder 92 to cause piston 94 to move to the right and carry slide 98 therewith. Exhaust fluid from the right of piston 94 returned to tank through conduit 90, ports 50 and 54 of valve 38, conduit 108, port 112 and chamber 138 of valve 114 and conduit 140 to the tank conduit 25. The directions of flow during rightward shifting of valve 40 and rightward travel of piston 94 will be opposite to that shown by the dotted arrows as the circuit is symmetrical.

The slide 98 will continue to move to the right until adjustable dog 100 contacts pin 132 of arm 130 (Figure 2) to revolve the latter to the right. This will shift valve spool 116 of valve 114 to the left. Land 120 of valve spool 116 gradually closes port 112 from chamber 138 to decrease the flow of exhaust fluid from cylinder 92 to thereby decelerate the slide 98 and when the flow is stopped to cause the slide to dwell.

When spool 116 has been shifted completely to the left port 146 is opened to port 148 to direct pilot pressure from chamber 20 of relief valve 22 through conduit 154 and check valve 86 to the right end of valve 38 to shift its spool 40 to the left. The resulting actions are similar to those described when the spool was shifted to the right. Exhaust fluid passes at first from port 64, through conduit 72, needle valve 76, conduits 80 and 152, port 142 and end chamber 147 of valve 114, conduit 168, and conduit 170.

The slide 98 will dwell at the end of its stroke until land 44 of valve spool 40 opens port 50 to the pressure port. The setting of needle valve 76 determines the time required for valve spool 40 to shift to the left, the period of dwell of the slide and the acceleration of the same in the opposite direction. The opening of land 44 will accelerate the slide in its movement to the left. The path followed by the fluid is the same as on the first stroke. When land 42 blocks port 64 exhaust fluid from the left end of valve 38 will pass through bore 60, groove 56, and port 66 until valve 38 reaches the limit of its travel. From port 66 the flow will be through conduit 80, restriction 81, conduit 152, port 142 and end chamber 147, conduit 168 and conduit 170 to tank.

The slide 98 will continue to reciprocate as described, namely with automatic predetermined deceleration at the end of each stroke, predetermined period of dwell and a predetermined rate of acceleration.

The relief valve has a further function in conjunction with the throttle 36 of controlling the rate of travel of the slide 98 during the constant velocity portion of the cycle. It will be noted that the piston 22 is subject on its upper side to the pressure in conduit 34 ahead of the throttle 36 and is subject on its lower side to the pressure in the conduit 30 beyond the throttle 36. Thus the net hydraulic force exerted on the piston 22 depends on the pressure drop through the throttle 36. Should this pressure drop tend to increase, the piston 22 will be forced downwardly, thus opening the valve slightly to permit a portion of the oil delivered by the pump 10 to by-pass to tank through conduit 25.

It will be seen that under all conditions an equilibrium position of the valve 22 is reached wherein sufficient oil is by-passed to maintain a fixed pressure drop through the throttle 36. With a fixed pressure drop through the throttle 36 it follows that the rate of flow therethrough is correspondingly fixed. Thus the velocity of the slide is maintained constant independently of variations in resisting load applied to the slide 98. In other words, the piston 22 automatically operates the relief valve to maintain a variable pressure in the chamber 20, which pressure corresponds exactly at any instant to the pressure in the cylinder 92 plus an increment determined by the spring bias on the piston 22. This phase of operation of the piston 22 and throttle 36 is described more fully in the patent to Harry F. Vickers, 2,102,865.

To bring the slide to a rest the plunger 134 in arm 130 is pulled out against the bias of spring 136 to remove the pin 132 from the path of dog 100. On the next stroke of the slide to the right the dog 100 will not contact pin 132 to shift valve spool 116; therefore piston 94 will continue to carry slide 98 to the right until cam 104 contacts roller 167 to depress valve 166. The relief valve 22 is thereby vented and the pump delivery by-passed as previously described and the slide 98 comes to rest. Another cycle of operation may be started by pushing in plunger 160.

While the form of embodiment of the invention, as herein disclosed, constitutes a preferred form, it is to be understood that other forms might be adopted, all coming within the scope of the claims which follow.

What is claimed is as follows:

1. In a hydraulic power transmission system the combination of a pump, a fluid motor operable in opposite directions, fluid conduits forming supply and return connections between the pump and motor, a pilot valve shiftable in opposite directions by the motor, a valve in said connections for controlling the fluid flow to the motor and controlled by the pilot valve, means including a three-way valve in series with the control valve and operated by the motor after predetermined movement thereof for blocking the return connection from the motor, means associated with said two last-mentioned valves for reestablishing flow in said return connection after the control valve has been shifted, a relief valve in the supply connection, a manually adjustable throttle in the supply connection, and means for controlling said relief valve to maintain a predetermined pressure drop through said throttle.

2. In a hydraulic power transmission system the combination of a pump, a fluid motor operable in opposite directions, fluid conduits forming supply and return connections between the pump and motor, a pilot valve shiftable in opposite directions by the motor, a valve in said connections for controlling the fluid flow to the motor and controlled by the pilot valve, means including a three-way valve in series with the control valve and operated by the motor after predetermined movement thereof for blocking the return connection from the motor, means associated with said two last-mentioned valves for reestablishing flow in said return connection after the control valve has been shifted, a relief valve in the supply connection, a manually adjustable throttle in the supply connection, means including a piston exposed to pressure ahead of and beyond said throttle for controlling said relief valve to maintain a predetermined pressure drop through said throttle, and means for unbalancing said piston to unload the pump.

3. In a hydraulic power transmission system the combination of a pump, a fluid motor, a pilot valve shiftable in opposite dierctions by the motor, a valve for controlling the fluid flow to the motor, a second fluid motor for operating said control valve and controlled by the pilot valve, a variable restriction for controlling the speed of movement of the control valve, and means forming a by-pass around said restriction for causing controlled motion of said control valve, said by-pass being opened by movement of the control valve to a predetermined position and having predetermined resistance for controlling the rate of movement of the control valve and the acceleration of fluid motor, said control valve having a range of movement before opening said by-pass during which the control valve is ineffective to change connections between the pump and first motor.

4. In a hydraulic power transmission system the combination of a pump, a fluid motor, a pilot valve shiftable in opposite directions by the motor, a valve for reversing the direction of fluid flow to the motor, reversible auxiliary fluid motor means for operating said reverse valve in opposite directions and controlled by the pilot valve, a pair of independently adjustable restrictions for controlling the speed of movement of the reverse valve, and means forming a by-pass around each restriction for causing controlled movement of the reverse valve, said by-passes being opened and closed by movement of the reverse valve and having predetermined resistance for controlling the rate of movement of the control valve and the acceleration of the fluid motor, said reverse valve having a range of movement before opening a by-pass during which the control valve is ineffective to change connections between the pump and first motor.

5. In a hydraulic power transmission system the combination of a pump, a fluid motor operable in opposite directions, fluid conduits forming supply and return connections between the pump and motor, a five-way reverse valve in said connections for controlling the fluid flow to and from the motor, said reverse valve including duplicate return connections, one for each side of the motor, and a three-way valve operated by the motor at opposite limits of its travel and connected with said duplicate connections to selectively block whichever of them is at the moment carrying the return flow from the motor while simultaneously unblocking the other whereby the motor is stopped when the three-way valve is shifted and is restarted in the opposite direction only after the reverse valve is shifted.

6. In a hydraulic power transmission system the combination of a pump, a fluid motor operable in opposite directions, fluid conduits forming supply and return connections between the pump and motor, a five-way reverse valve in said connections for controlling the fluid flow to and from the motor, said reverse valve including supply and return connections, one of which is duplicate, one for each side of the motor, and a three-way valve operated by the motor at opposite limits of its travel and connected with said duplicate connections to selectively block whichever of them is at the moment carrying the return flow from the motor while simultaneously unblocking the other whereby the motor is stopped when the three-way valve is shifted and is restarted in the opposite direction only after the reverse valve is shifted.

7. In a hydraulic power transmission system the combination of a pump, a fluid motor operable in opposite directions, fluid conduits forming supply and return connections between the pump and motor, a pilot valve shiftable in opposite directions by the motor, a five-way reverse valve in said connections and controlled by the pilot valve for controlling the fluid flow to and from the motor, said reverse valve including supply and return connections, one of which is duplicate, one for each side of the motor, and a three-way valve operated by the motor at opposite limits of its travel and connected with said duplicate connections to selectively block whichever of them is at the moment carrying the return flow from the motor while simultaneously unblocking the other whereby the motor is stopped when the three-way valve is shifted and is restarted in the opposite direction only after the reverse valve is shifted, said pilot valve and three-way valve being connected together for simultaneous operation.

RAYMOND S. MILLER.